Figure 1:
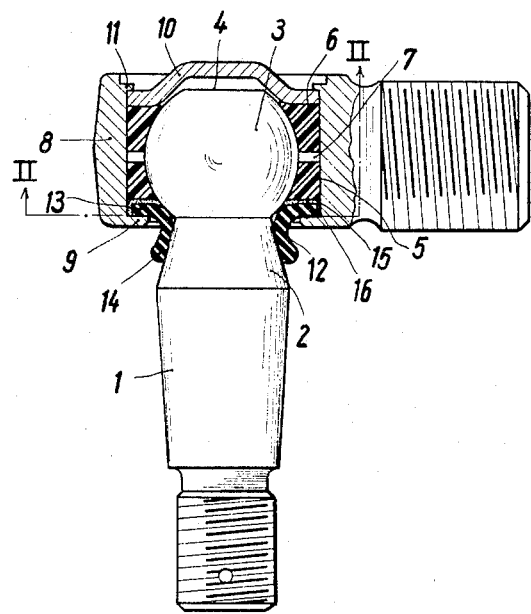

Sept. 20, 1966  J. ULDERUP  3,273,923
BALL JOINT
Filed July 31, 1963

JÜRGEN ULDERUP
*Inventor:*

Karl J. Ross
AGENT

3,273,923
BALL JOINT
Jürgen Ulderup, Lemforde (Hann.), No. 207, Germany
Filed July 31, 1963, Ser. No. 298,903
Claims priority, application Germany, Aug. 3, 1962,
L 42,618; Dec. 24, 1962, U 9,479
2 Claims. (Cl. 287—87)

My present invention relates to ball joints of the general type frequently employed in the steering mechanisms of automotive vehicles and, more particularly, to pivotal connections between two members relatively displaceable with respect to one axis but with relative movability in other degrees of freedom as well.

In my copending application, Ser. No. 268,252, filed March 21, 1963, I disclose and claim a female or socket member for such a coupling wherein a bearing seat is molded or cast into a body of a synthetic resin and thus reinforces the latter in the region at which the male member engages it. A tubular insert in the synthetic resin body serves to connect it to a pitman, rod or the like. Couplings and joints of this type find important use in the steering linkages of automotive vehicles at the steering knuckles, pivots, between the steering-knuckle arms and the tie rod, between the drag link and an intermediate knuckle arm, and between the pitman and the drag link. Similar pivots are employed in so-called "power-steering systems" wherein hydraulic or pneumatic means act upon the drag link and/or tie rod previously described. When the term "ball joint" is used herein, it is intended to signify not only connections or couplings of the fully universal type but also those pivotal connections in which at least some relative movement between the members is permitted about, for example, at least two mutually perpendicular axes or with at least two degrees of freedom. Thus, as it the case with ball joints of an automotive steering linkage, substantial relative movement can be effected about the principal axis, while limited relative displacement is permitted about an axis perpendicular to the principal axis.

Heretofore such joints have comprised a ball-shaped male member of having at least a partly spherical configuration, which was received within a bearing shell of the socket-forming member, while the latter includes a coil spring or the like maintaining pressure between the ball and the bearing shell or seat to take up play resulting from wear of the latter. Additionally, a sealing ring or the like was interposed between the mouth of the socket and the ball to prevent entry of foreign matter into the seat. The flexible sealing means served no other substantial function. Structures of this type, wherein the spring was seated against a cover plate of the female member, where inordinately large, due to a large extent to the use of the coil spring, and difficult to handle (i.e. to assemble, repack and replace).

It is the principal object of the present invention to provide a ball joint wherein the disadvantages of earlier devices of this type are eliminated.

It is a further object of the invention to provide an improved ball joint whose simplicity and effectiveness render it particularly suitable for use in the steering linkage of an automotive vehicle.

These objects are attained, in accordance with the present invention, by providing a ball joint of the character described wherein, however, the aforementioned coil spring is eliminated and the flexible sealing means replaced by an annular sealing member of a resiliently compressible elastomeric material which is preloaded and thus serves to urge the ball portion of the male member into engagement with the seat formed by an antifriction bearing means in the socket portion of a female member.

Advantageously, the annular sealing means is composed of a shape-retentive molded body of a highly resilient elastomer, such as a polyurethane which is loaded (i.e. under axial compression) against the bearing means. Thus the latter can be composed of a pair of axially spaced annular bodies having segmental spheroidal seats receiving the ball portion of the male member, at least one of these bodies abutting a cover plate closing one end of a sleeve forming the socket portion.

According to a further aspect of this invention, the joint is assembled and the sealing means loaded by forcing the cover plate into the central passage of the sleeve of the female member of the joint. In this case, the segmental bodies have seats whose maximum diameter is less than that of the ball portion so that the sealing ring urges the bearing segment, directly in contact therewith, against the ball whereby the latter is forced against the other segment axially spaced from the first-mentioned one.

According to another feature of this invention, the resilient compression of the annular seal and its positioning are simultaneously achieved by forming the seal with an annular flange transverse to the principal axis of the joint and adapted to overlie an inwardly directed flange of the sleeve. The flange of the sealing means is thus clamped, upon insertion of the cover plate, between the sleeve and the segment of the bearing means in contact therewith. So that the sealing means can, in addition to replacing the usual coil spring, serve as a block to the entry of foreign matter into the concave socket portion of the female member, the sealing member should have a collar portion extending generally in the direction of the principal axis and normally centered thereon, the collar portion being in all-around contact with a neck of the male member upon which the ball portion is formed. The sealing means thus bridges the neck of the male member and the socket portion of the female member at the opening or mouth of the latter.

Still another feature of this invention resides in the formation of the sealing means as a laminate provided with at least one layer of a shape-retentive (i.e. highly elastic) foam material (preferably a polyurethane base resin). Best results are obtained when the layer of foam is interposed between the molded polyurethane body and the bearing segment immediately adjacent it. Advantageously, the upper end of the sealing ring, i.e. that proximal to the flange, is of reinforced or increased thickness as compared, for example, with conventional flexible seals. This thickened region ensures that expansion of the polyurethane body, to compensate for wear of the bearing segments, will be sufficient. I have found that this joint is particularly effective when employed in power-steering linkages operable with hydraulic fluid in automotive vehicles.

Figure 2:
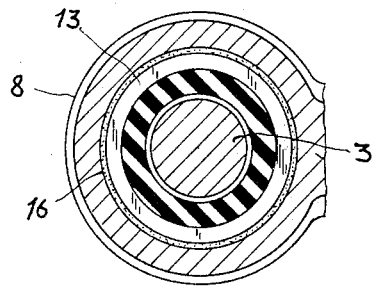

The above and other objects, features and advantages will become more readily apparent from the following description, reference being made to the appended drawing in which:

FIG. 1 is an axial cross-sectional view, with the male member in elevation, of a ball joint according to the invention; and FIG. 2 is a cross-sectional view taken along the lines II—II of FIG. 1.

In the drawing, I show a male member 1, adapted to be secured to a steering knuckle of an automotive vehicle whose ball portion or head 3 is formed at the end of a frustoconical neck 2 and has a flattened end 4. The ball portion 3 is journaled in annular bearing segments 5, 6 which are formed as half shells and are composed of an antifriction material with long wearing characteristics. These segments can, for example, be composed of self-lubricating substances and are, preferably, formed from a synthetic resin permeated with molybdenum disulphide; it should be noted, however, that conventional bearing metals can also be used. The segments 5 and 6 are axially spaced by an angular gap 7 whose width is sufficient to permit relative movement of the segments toward one another upon wear of the hemispheroidal seats thereof.

Segments 5 and 6 are received within the passage of a sleeve or eye 8 of the female member, whose transverse inwardly directed flange 9 serves as a stop for the bearing means at the lower end of the sleeve, while axially convex cover plate 10, held against another inwardly directed flange or ridge 11, forms an annular abutment at the upper end of the sleeve for the body 6. According to an essential feature of this invention, intermediate flange 9 and the neck 2 of the male member 1 dispose the thickened flange 13 of a resiliently compressible elastomeric (i.e. polyurethane) sealing ring 12 whose lower reinforced edge 14 is in all-around engagement with neck 2. End 14 is formed as an axially extending collar snugly surrounding neck 2. The ball joint can be assembled by initially inserting the sealing ring 12 into engagement with flange 9 through the upper end of the passage of sleeve 8 and then disposing the lower bearing segment 5 upon flange 13. The male member 1 can then be forced through the passage until its ball portion 3 is seated against segment 5 and the other segment 6 forced past flange 11 against ball portion 3, the cover plate 10, in the form of a disk whose diameter initially can be somewhat smaller than that of flange 11, is then disposed upon segment 6 and rolled into engagement with the underside of flange 11, thereby axially compressing or loading the sealing member 12 at least at its flange 13. The downward compression force exerted by this operation presses segment 6 against ball 3 and the latter against segment 5 which, in turn, bears upon the sealing ring. Advantageously, an axial compression of the ring of about 2 mm. occurs. Since the polyurethane is highly resilient and shape-retentive, it is not plastically deformed by this compression and continuously urges the bearing segments against the ball 3.

The sealing ring can be formed upon a single homogeneous body of polyurethane resin or be a laminate having a core or support structure of the molded polyurethane. Advantageously, however, a layer of highly resilient polyurethane base foam 15 is cemented, vulcanized or otherwise bonded to the seal intermediate the latter and segment 5, while another layer 16 of the foam is provided at the outer edge of flange 13. Highly advantageous compression forces are obtained in this manner and the need for a coil spring totally eliminated. The device is especially suitable for use under circumstances in which relatively light pressure of the bearing means against the ball portion is required and where a relatively constant compression force must be maintained at substantially all temperature conditions. When the laminate is used, a resilience intermediate that obtained when only polyurethane foam is employed (light pressure) and that resulting when the more dense molded polyurethane (relatively heavy pressure) are employed.

The invention described and illustrated is believed to admit of many modifications within the ability of persons skilled in the art, all such modifications being considered within the spirit and scope of the appended claims.

What is claimed is:
1. A ball joint comprising:
  (a) a female member having a generally cylindrical socket provided with a reduced opening at one end defined by an inwardly extending annular flange;
  (b) a male member having a ball portion receivable in said socket and a neck extending substantially axially from said socket portion through said end thereof;
  (c) antifriction bearing means in said socket in engagement with said ball portion, said bearing means including a pair of axially spaced annular bodies having generally spheroidal seats and bearing axially upon said ball portion on opposite sides of a diametral plane therethrough;
  (d) an annular resiliently compressible elastomeric seal disposed in said opening and bridging said neck and said socket at said opening while pressing axially upon said ball portion to urge it against said bearing means, said seal having an annular outwardly extending flange overlying said inwardly extending flange of said socket and disposed between said inwardly extending flange and said bearing means while clamped thereby in said socket, a collar portion extending axially outwardly from said opening along said neck, and a layer of an elastomeric foam disposed intermediate said bearing means and said outwardly extending flange and also along the outer periphery of said outwardly extending flange, said outwardly extending flange being compressed between said bearing means and said inwardly extending flange; and
  (e) closure means at the other end of said socket whereby said bodies and said seal are retained under compression between said inwardly extending flange and said closure means.

2. A ball joint as defined in claim 1 wherein said closure means includes an annular inwardly extending ridge at said other end of said socket, an axially outwardly convex cover plate within said socket and axially engaged along its periphery by said ridge, said cover plate having a recess partly receiving said ball portion and flanked by an annular surface surrounding said ball portion, one of said bodies bearing axially against said surface, the other of said bodies bearing axially against said outwardly extending flange of said seal, said seal being composed of a polyurethane base substance and having an increased thickness in the region of said outwardly extending flange.

References Cited by the Examiner
UNITED STATES PATENTS

| | | | |
|---|---|---|---|
| 2,275,235 | 3/1942 | Shanklin et al. | 277—228 X |
| 3,027,182 | 3/1962 | Reuther | 287—87 |
| 3,086,801 | 4/1963 | Herbenar. | |
| 3,119,634 | 1/1964 | Gottschald | 287—87 |
| 3,129,023 | 4/1964 | Fierstine. | |
| 3,139,274 | 6/1964 | Hodgkins | 287—87 X |

FOREIGN PATENTS

| | | |
|---|---|---|
| 959,431 | 9/1949 | France. |
| 840,176 | 7/1960 | Great Britain. |

CARL W. TOMLIN, *Primary Examiner.*

A. V. KUNDRAT, *Assistant Examiner.*